(12) United States Patent
White et al.

(10) Patent No.: US 6,213,905 B1
(45) Date of Patent: *Apr. 10, 2001

(54) ROLLER CHAIN SPROCKETS ORIENTED TO MINIMIZE STRAND LENGTH VARIATION

(75) Inventors: David C. White, Dryden; Harold J. Fraboni, Freeville, both of NY (US)

(73) Assignee: BorgWarner Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/364,341

(22) Filed: Jul. 30, 1999

Related U.S. Application Data
(60) Provisional application No. 60/142,194, filed on Jul. 1, 1999.

(51) Int. Cl.[7] ................................ F16H 7/00; F16H 7/06
(52) U.S. Cl. ............................................. 474/148; 474/156
(58) Field of Search ................................. 474/156, 157, 474/152, 160, 212, 231, 155, 148, 140, 164, 161, 901, 133–138; 74/437; 29/159.2

(56) References Cited

U.S. PATENT DOCUMENTS

| | | | |
|---|---|---|---|
| 1,605,962 | * 11/1926 | Lovejoy | 474/135 |
| 3,272,026 | * 9/1966 | Hale | 474/135 |
| 3,377,875 | 4/1968 | Sand | 74/229 |
| 4,036,071 | 7/1977 | McKnight et al. | 74/243 R |
| 4,168,634 | 9/1979 | Griffel | 74/243 R |
| 4,191,062 | * 3/1980 | Gardner | 474/132 |
| 4,348,200 | * 9/1982 | Terada | 474/160 |
| 4,526,558 | * 7/1985 | Durham | 74/437 X |
| 5,427,580 | 6/1995 | Ledvina et al. | 474/84 |
| 5,507,697 | 4/1996 | Ledvina et al. | 474/85 |
| 5,848,948 | 12/1998 | Allen | 474/156 |
| 5,876,295 | 3/1999 | Young | 474/156 |

FOREIGN PATENT DOCUMENTS

| | | |
|---|---|---|
| 0 907 041 A1 | 4/1999 | (EP) . |
| WO 97/11292 | 3/1997 | (WO) . |
| WO 98/29673 | 7/1998 | (WO) . |

* cited by examiner

*Primary Examiner*—David A. Bucci
*Assistant Examiner*—Marcus Charles
(74) *Attorney, Agent, or Firm*—Sidley & Austin; Greg Dziegielewski

(57) ABSTRACT

The present invention is directed to a roller chain and sprocket drive which has at least two sprockets with varied radial seating positions. The relative orientation of the sprockets are adjusted to provide favorable dynamics to the drive. This can include the minimization of the strand variation and providing the maximum strand variation for each chain strand to be phased differently than other strands.

14 Claims, 4 Drawing Sheets

ROLLER CHAIN SPROCKETS ORIENTED TO MINIMIZE STRAND LENGTH VARIATION

This application claims benefit to Provisional Application No. 60/142,194 filed on Jul. 1, 1999.

BACKGROUND OF THE INVENTION

Numerous methods have been developed to reduce the radiated noise levels generated by the engagement of roller chains with sprockets. One such method modulates the roller engagement by randomizing in a predetermined pattern (hereinafter "randomized") the radial seating position of the rollers engaging a sprocket while maintaining a constant chordal length between the seated rollers on the given sprocket. Such a device is disclosed in copending U.S. patent application Ser. No. 09/153,317, filed Sep. 15, 1998, assigned to the same assignee as the present application which disclosure is hereby incorporated by reference herein in its entirety.

In a sprocket of this type, the interaction between engagement positions on adjacent sprockets plays a significant role in system geometry and dynamics. If the entrance engagement of one sprocket and the exit engagement of an adjacent sprocket are both "high" or maximums, the chain strand between these two points will be shorter than normal. Conversely, if the entrance and exit engagement points are both "low" or minimums, the contained chain strand will be longer than nominal. In a tensioned system, the tensioner must be able to adequately react to these random sprocket and strand variations as well as the normal dynamics of any drive system. In systems of three or more shafts, these considerations become even more significant. These systems could conceivably be designed such that each chain strand in the system could be forced to become shorter or longer than nominal all at the same time. If this were to occur, the other components in the system would be required to react to these changes. For example, a tensioner may require additional stroke than would be normally designed to take up the additional chain slack when all strands cycle from their shortest to longest length. This change in system strand length from short to long may also occur in such a short time span that the tensioner may not respond quickly enough and loss of system control could occur. Another condition that could arise from changes in strand length is unwanted accelerations and decelerations of the driven shafts.

SUMMARY OF THE INVENTION

The present invention is directed to a roller chain and sprocket drive having at least two sprockets. Each (depending on the application, acceptable noise can sometimes be demonstrated when only some of the sprockets in the drive are randomized (e.g. 2 of 3, 2 of 4, 2 of 5, 3 of 5, etc., as long as at least two sprockets are randomized)) of the sprockets has a varying radial seating position of the rollers on the roller chain while maintaining a constant chordal dimension between seated rollers. This variation or randomization is intended to provide a noise modulation effect while avoiding the negative effects of periodic impacts from conventional randomized sprockets. The orientation of each of the sprockets relative to the other sprockets is chosen to provide favorable dynamics to the drive.

The orientation of the first and second sprockets is determined so that the roller chain and sprocket drive has favorable dynamics by designing the system such that the timing of the chain coming into engagement in the different radial positions alternates from the entrance and exit of the same strand. In other words, the positioning of the sprockets is such that the strand variation is minimized and the strand variation between sprockets is moved out of phase.

DESCRIPTION OF THE INVENTION

The present invention is directed to a roller chain and sprocket drive which utilizes sprockets having randomized radial seating positions, with the sprockets arranged within the drive to be in an orientation with each other to provide favorable dynamics to the roller chain and sprocket drive, including the minimization of strand variation and providing that the strand variation that does exist is out of phase for the sprockets.

Figure 1:
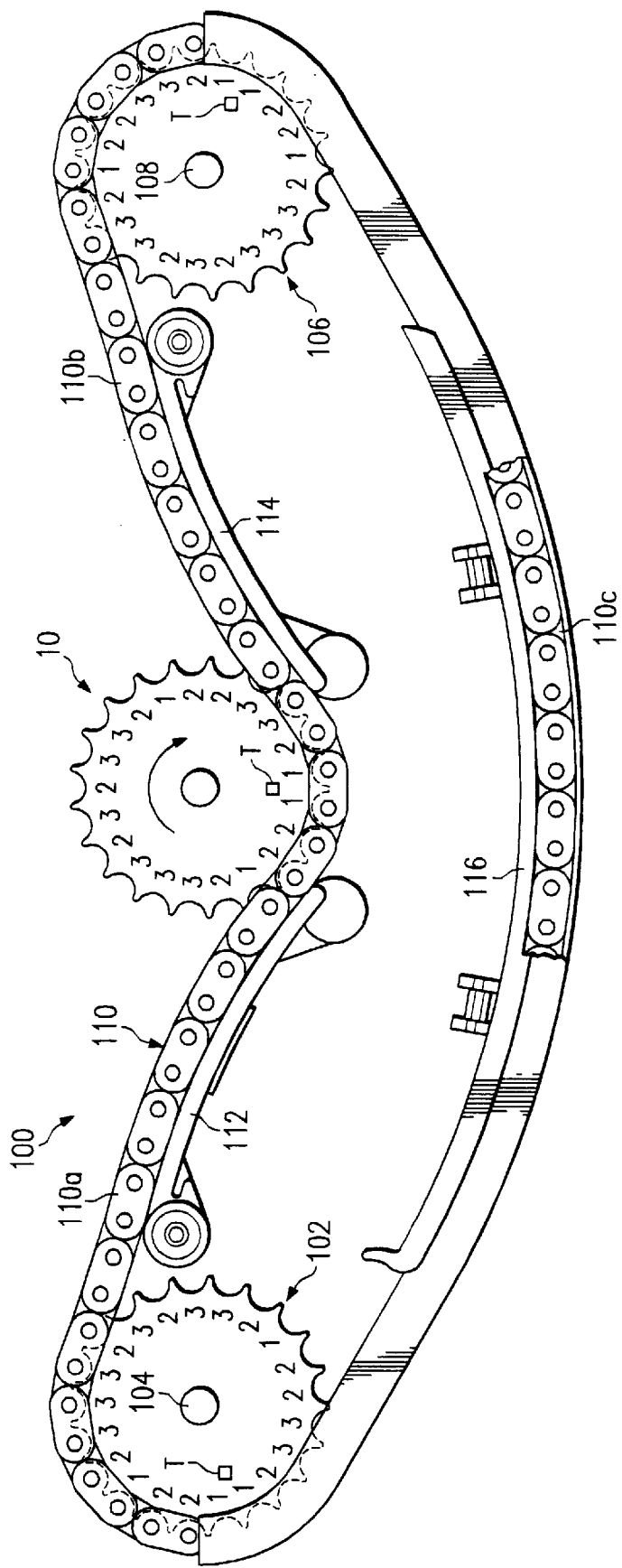
FIG. 1 is a side view of a roller chain and sprocket drive having randomized radial seating position with the sprockets all oriented the same relative a timing mark.

With reference to FIG. 1, a roller chain and sprocket drive 100 is illustrated. The drive has a sprocket 10 connected to a drive shaft end of a crankshaft, a sprocket 102 on a first (rear) balance shaft 104 and a sprocket 106 on a second (front) balance shaft 108. A chain 110 engages the sprockets 10, 102 and 106. Chain 110 can be a roller chain with a freely rotating roller or a bushing chain which does not freely rotate. Reference to a roller chain herein is meant to include either a freely rotating roller chain or a bushing chain. Chain tensioners 112 and 114 tension the chain 110 while a chain guide 116 guides the chain 110.

As will be described, each (as noted previously, depending on the application, acceptable noise can sometimes be demonstrated when only some of the sprockets in the drive are randomized (e.g., 2 of 3, 2 of 4, 2 of 5, 3 of 5, etc., as long as at least two sprockets are randomized)) sprocket has teeth with a root diameter (RD) which varies randomly in a predetermined manner from tooth to tooth in the sprocket to reduce the engagement frequency without introducing harsh impact loads on the rollers or bushings.

With reference to FIGS. 5–8, sprocket 10 is illustrated with rollers 12, 14 and 16 of the roller chain 110 seated between two teeth 18 and 20.

Figure 5:
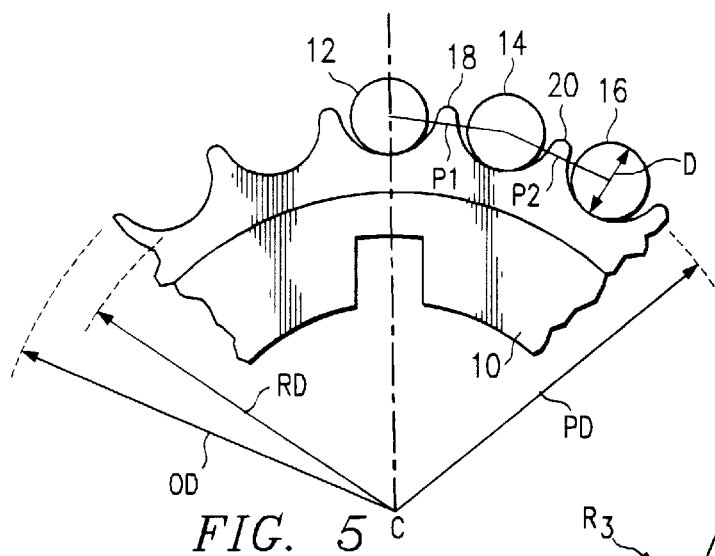
FIG. 5 is a side elevational view of a portion of a roller chain sprocket illustrating the location of the root diameter, pitch diameter and outer diameter.

In FIG. 5, sprocket 10 is shown with rollers 12, 14, 16 of roller chain 110 seated between two teeth 18, 20. The sprocket is characterized by dimensions of an outer diameter (OD), a root diameter (RD) and a pitch diameter (PD). The outer diameter is the dimension from the sprocket center point C to the outermost location on a tooth. The root diameter is the dimension from the sprocket center point C to the lowermost location in the root between two adjacent sprocket teeth. The pitch diameter is the dimension from the sprocket center point C to the pitch circle of the sprocket. Each roller also has a diameter of dimension D.

Figure 6:
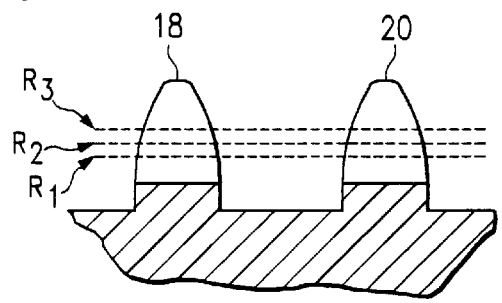
FIG. 6 is a sectional view of adjacent sprocket teeth illustrating the nominal seating radius, upper seating radius and lower seating radius.
Figure 8:
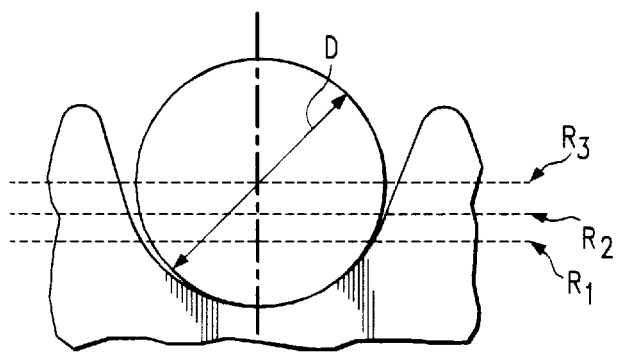
FIG. 8 is a sectional view of a roller and associated sprocket tooth.
Figure 7:
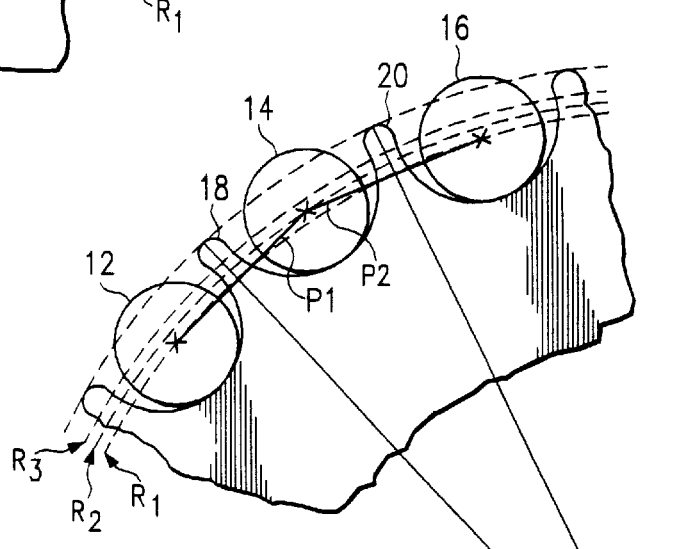
FIG. 7 is a side sectional view of a portion of a sprocket illustrating the seating of the rollers of the associated roller chain.

In FIGS. 6, 7 and 8, the arcs that correspond to the maximum seating radius (R3), the minimum seating radius (R1), and nominal seating radius (R2) of the rollers are shown. As the rollers move from seat to seat between the sprocket teeth, the radial position at which the rollers seat varies between the maximum radius, nominal radius and minimum radius. The angular displacement of the sprocket is the angular distance between the center of the roller in one seat and the center of the roller in an adjacent seat. The angular displacement is effectively altered from seat to seat around the sprocket. Very small changes in the angular displacement from root to root can have a large effect on the timing of the roller engagement with the seat and therefore a large effect on generation of impact noise. Impact noise includes both a radial component from the roller or bushing striking the bottom of the root as well as a tangential component from the roller or bushing striking the side of the root (or tooth). The design is primarily directed to randomization of this radial component, in contrast to the modification of the tangential component in some prior art sprockets which relieve the side of the tooth.

At the same time, the pitch distance (or chordal length) between seated rollers remains constant. Maintaining a constant chordal length reduces the impact load of the rollers against the teeth. The variation in the seating position from tooth to tooth results in a modulation of the timing of successive impacts. This modulation reduces the pitch frequency noise produced by the chain drive.

The effective tooth thickness as measured at an arbitrary point along the tooth will vary from tooth to tooth around the sprocket as a result of the modification of the root diameters. However, the geometry or shape of the root or pocket which holds the roller in its seated position is maintained generally the same from tooth to tooth. The design is directed to maintaining the engagement (or seating) of the roller with the root of the sprocket, but changing the position of the root radially from tooth to tooth. Thus, the modification is directed to the root location or position and not to the tooth profile.

A pattern of variation in seating position is chosen as the teeth progress around the sprocket. Preferably, the pattern is random. That is, it varies irregularly around the sprocket. Preferably, the pattern does not contain any abrupt transitions from the upper seating or the lower seating positions to the other extreme position without passing through the nominal seating position for at least one tooth. Avoidance of abrupt transitions should contribute to the smooth running of the chain and reduce the generation of mechanical noise and reduce wear on the rollers. Of course, random here is meant to be randomized in a predetermined pattern. This means that the pattern of teeth depths is predetermined before the manufacture of the sprocket and is a random sequence, for example (R1, R2, R2, R2, R1, R1, R2, R1, R2, R2, R1, R1) in contrast to pure alteration such as R1, R2, R1, R2, R1, R2, or pure repeating patterns, such as R1, R1, R2, R2, R1, R1, R2, R2. Clearly the manufacture is not random. The manufacture of the sprocket is predetermined to have the pattern designed with the random characteristic. Also, it should be clear that the root diameter is not limited to high, nominal and low seating positions. There may be less variation, i.e., simply a nominal and low seating position, or more than three seating positions, such as a high, medium high, nominal, medium low and low, in decreasing radius. Further, the seating position can also be a continuous variation, without predetermined steps of radius.

In order to generate the profile of the sprocket of the present invention, the location of the seating radius of each root (or the space between sprocket teeth in which the rollers seat) must be determined. While locating the seating position of each roller, the pitch distance between seated rollers must remain constant.

As an example of the design of a sprocket with three radial seating positions, a starting value for the mean pitch radius R2 is first chosen. The value of the pitch distance, or the nominal pitch radius $\frac{1}{2} \times P \times 1/\sin(180/N)$, where N is the number of sprocket teeth, is a convenient choice. In other words, a starting value for R2 may be the pitch distance P1 between adjacent seated rollers on the associated chain divided by the quantity $2 \times \sin(180/N)$.

The minimum and maximum pitch radii values are then calculated from the mean pitch radius value. The minimum, or R1, is calculated by subtracting one-half the value of the peak-to-peak pitch radius variation (Delta) from R2. The maximum, or R3, is calculated by adding one-half the value of the peak-to-peak pitch radius variation (Delta) to R2. The first roller center is then located at top dead center of the sprocket at a distance R2 from the sprocket center. The next adjacent roller center is then located so that it is a constant chordal distance P (or the nominal pitch value) from the first roller center and is at a radial distance R1, R2 or R3 from the sprocket center point, depending on the chosen random pattern. The next adjacent roller is then located so that it is a constant chordal distance P from the center of the second roller and is a distance R1, R2 or R3 from the sprocket center point C, depending on the chosen random pattern.

In one example in a standard sprocket for a roller chain for a commercial engine timing drive, the variation between the maximum and minimum was arbitrarily established at 1 mm. The differences in root radius were then set at ½ mm or ¼ mm. Other radii differences may be utilized depending on sprocket size as well as other considerations.

As shown in the drawings, rollers 12 and 14 are separated by pitch distance P1 and rollers 14 and 16 are separated by pitch distance P2. In accordance with the present invention, P1 is the same as P2, and the remaining pitch distances of the seated rollers around the sprocket are also the same distance. As the rollers progress around the sprocket, the rollers are seated at different distances from the center point (C) of the sprocket 10. For example, roller 12 is seated at radius R1, roller 14 is seated at radius R2 and roller 16 is seated at radius R1.

In order to complete the entire sprocket, the chordal pitch distance between the seated first roller and the seated last roller must also equal the nominal pitch, or P. If the chordal pitch distance is not the same as the other seated rollers, then the mean pitch radius R2 must be increased or decreased and the sprocket profile regenerated. Once the seated rollers are appropriately positioned on the profile, the sprocket teeth are positioned so that the radial position of each root or seat is located with the desired clearance between the seat and its mating roller, and such that the tooth space center line is coincident with the radial line from the sprocket center to the mating roller center. The final sprocket profile will likely require the use of blend radii between adjacent teeth.

Thus, a sprocket profile has been provided in which the distances between the centers of the seated rollers (or the pitch distance or chordal distance) remains constant around the sprocket while the location of the seat of each roller varies so that the center of the associated roller is located on an arc of one of three radii distance from the center point of the sprocket.

Figure 2:
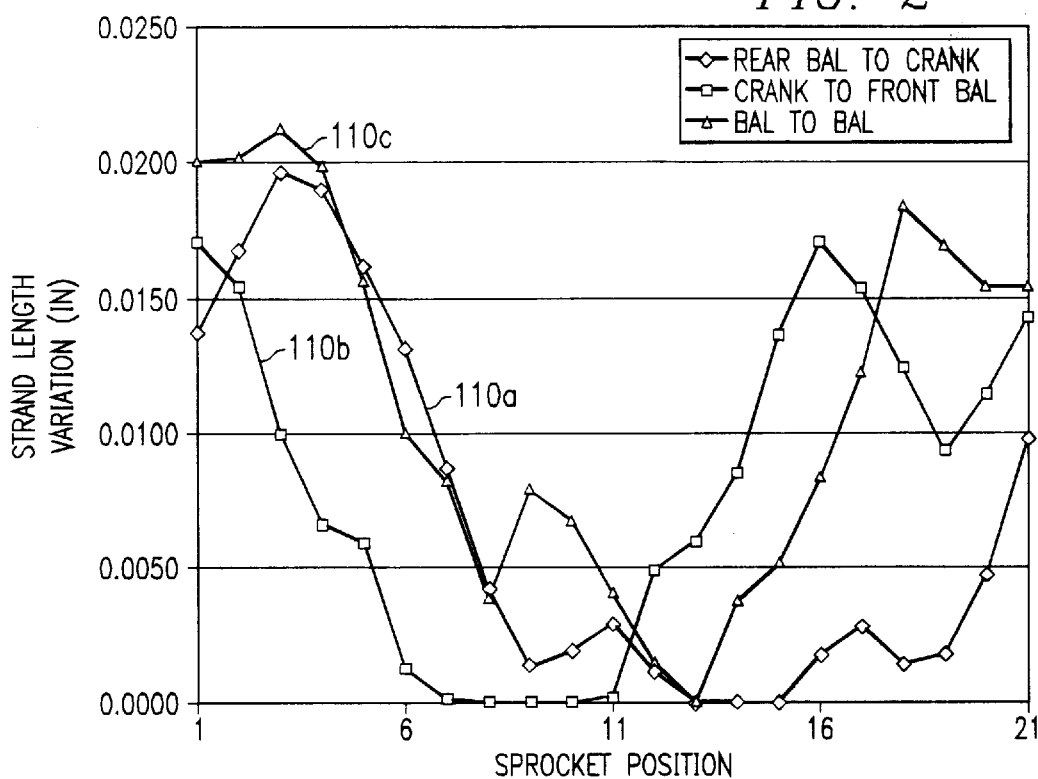
FIG. 2 is a graph of the strand variation with sprocket position for the drive of FIG. 1.

As can be seen in FIG. 1, each of the sprockets 10, 102 and 106 have three different root diameters indicated by arbitrary numbers 1, 2 and 3. The sprockets each have the same pattern relative the timing marks T of the sprockets and are therefore oriented relative each other in the same relationship to each other relative timing marks T. The pattern illustrated is 1, 2, 2, 1, 2, 3, 3, 3, 3, 2, 3, 2, 3, 3, 2, 1, 2, 2, 3, 3, 2, 1 from the timing mark T in a clockwise direction. The sprocket 10 rotates in the clockwise direction as shown in FIG. 1 in the direction of the arrow. With reference to FIG. 2, this figure represents the strand length variation for the three sprocket drive of FIG. 1. The graph depicts the length of the three chain strands, 110a, 10b and 110c in the drive as the sprockets are rotated through one complete revolution. As can be seen from the graph, maximum strand length variations are approximately 0.020 inches for all strands in the specific example tested. Perhaps more importantly, the length variations of each strand mimic one another (all are attempting to lengthen or shorten at the same time). This can be said to show that the chain strands are "in phase". As can be appreciated, all three of the chain strands have a relative maximum strand variation at about the same position, corresponding to about sprocket position 2 or 3. Two of the chain strands have another peak at about sprocket position 16.

Figure 3:
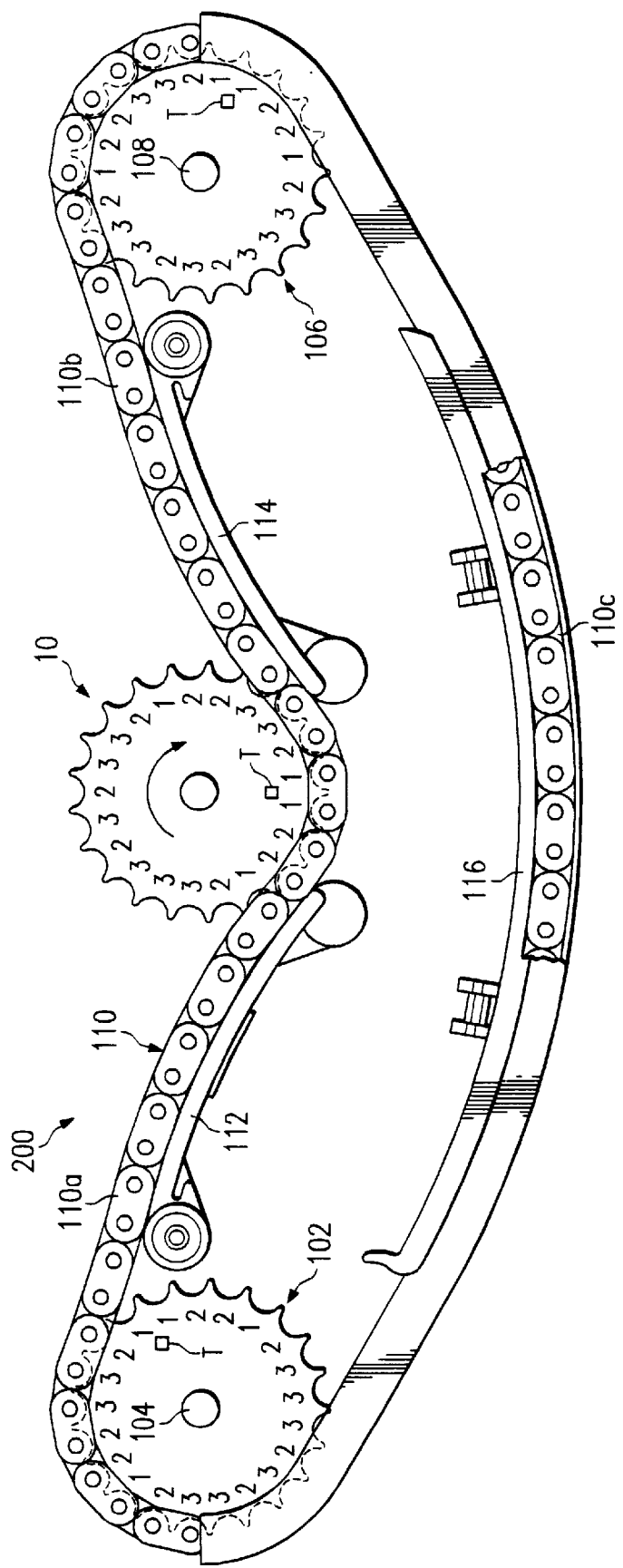
FIG. 3 is a side view of a roller chain and sprocket drive with randomized radial seating position as taught by the present invention, with at least one sprocket oriented differently than the other sprockets to minimize strand variation.

FIG. 3 illustrates a roller chain and sprocket drive 200 designed in accordance with the teachings of the present invention. In drive 200, the elements are identical to drive 100, and are identified by the same reference numerals however, it will be noted that the pattern of root diameters in balance shaft sprocket 102, while still in the sequence of the other sprockets, has been rotated 10 teeth in the direction of rotation from its position shown in FIG. 1 relative to the chain 110 and sprockets 10 and 106. In other words, the orientation of the sprockets relative each other is changed to minimize strand variation and change the phase of the strand variation to avoid multiple strand variation peaks occurring simultaneously. The direction of rotation of sprocket 10 is still clockwise as seen in FIG. 3. This changes the variation of strand lengths as the system rotates to make them more consistent.

Figure 4:
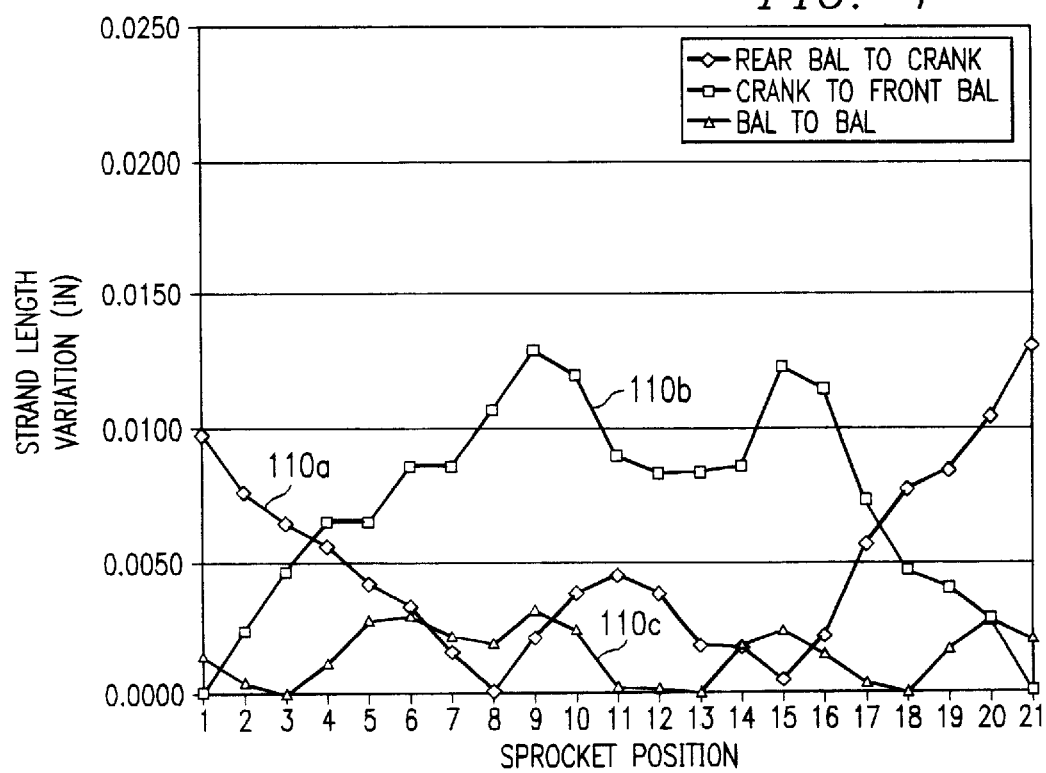
FIG. 4 is a graph of the strand variation versus sprocket position for the drive of FIG. 3.

FIG. 4 illustrates the improvement provided by the design of FIG. 3. As shown, the strand variation for chain strands 110a, 110b and 110c are reduced significantly from that of the embodiment of FIG. 1. The maximum strand variation, for example, is only about 0.013 inches. It can also be seen that the maximum strand variation of each of the strands has been moved out of phase relative sprocket position so that the dynamics of the system are more favorable.

The design of the system is such that the timing of the chain coming into engagement in the different radial positions alternates from the entrance and exit of the same strand. That is, the particular strand in the chain should be exiting one sprocket at a "high" position while entering the next sprocket at a "low" position or exiting at a "low" position and entering at a "high" position. This may not always be possible since each sprocket needs to have a specific pattern to adequately break up the engagement frequency. However, both exiting and entering at a "high position" or both at a "low" position should be minimized or eliminated. Each sprocket in the drive may or may not have the same pattern.

As can be seen, by comparing the design of FIG. 1 and FIG. 3, the chain strand length variation over one rotation of the sprocket has now been reduced to approximately 0.012 to 0.013 inches for two of the three strands and approximately 0.005 inches for the third strand. This is a reduction in variation of approximately 40%. Additionally, it should be noted that the strands length variations of the two crank to balancer strands are now "out of phase". This means that as one strand is lengthening, the other is getting shorter and vice versa. This is significant for system dynamics in that the tensioner (or tensioners) does not need to react to as large an overall shortening or lengthening of the system. As one strand lengthens and the other shortens, the tensioner sees a chain system that is not changing from the mean as significantly as one when these changes are not properly oriented. The speeds of the driven shafts also remain more constant when the chain strands lengths are managed in this fashion.

The present invention can be employed to provide favorable dynamics for roller chain and sprocket drives where at least two sprockets utilize randomized radial seating positions. It can also be used where the radial seating positions are not randomized and are designed in a pattern such as pure alteration or pure repeating patterns. Also, the present invention can be employed with roller chain and sprocket drives which have "phased" sprockets, such that one sprocket is phased ½ or ⅓ tooth ahead of the other sprocket(s). As such, the present invention contemplates orienting the sprockets relative to each other and to the chain to provide for the most favorable dynamics by minimizing the strand variation and by decoupling the maximum strand length variations for the strands as much as possible.

What is claimed is:

1. A roller chain and sprocket drive, comprising:

a roller chain having a plurality of pairs of interleaved lengths, said pairs of lengths being interconnected by pivot pins, each of said pivot pins containing a roller member;

first and second generally circular sprockets, each sprocket having a plurality of teeth spaced about its periphery, each sprocket including roots located between pairs of adjacent teeth for receiving said rollers, each of said roots having a root radius defined as the distance between the center of a sprocket and the point along said root closest to the sprocket center in the radial direction, at least one of said roots having a first root radius, at least one of said roots have a second root radius, said second root radius being less than said first root radius, said first root radius and said second root radius being defined so that the distance between the centers of adjacent rollers will be generally equal along said rollers seated in said sprocket roots, and said chain extending between said first and second generally circular sprockets to define a first strand length along a first length of said chain between a first initial engagement point with said first sprocket and a first initial engagement point with said second sprocket, said chain extending between said first and second generally circular sprockets to define a second strand length along a second length of said chain between a second initial engagement point with said first sprocket and a second initial engagement point with said second sprocket, said first strand length and said second strand length each varying as said chain travels around said sprockets and different portions of the chain are presented to said engagement points of said sprockets, said first strand length variation having a maximum variation defined as the difference between a maximum length of said first strand and a minimum length of said first strand, said second strand length variation having a maximum variation defined as the difference between a maximum length of said second strand and a minimum length of said second strands, a position of said engagement points of the first and second generally circular sprockets and the roller chain selected to provide favorable dynamics to the roller chain and sprocket drive.

2. The roller chain and sprocket drive of claim 1 wherein the position of the engagement points of the first and second generally circular sprockets and the roller chain provide favorable dynamics by minimizing the variation of said first strand length and said second strand length.

3. The roller chain and sprocket drive of claim 1 wherein the position of the engagement points of the first and second generally circular sprockets and roller chain are oriented to provide favorable dynamics by separating the occurrence of maximum strand variation for each sprocket by separating the occurrence of said maximum first strand length variation from the occurrence of said maximum second strand length variation.

4. The roller chain and sprocket drive of claim 1 wherein a plurality of said roots have said first root radius and a plurality of said roots have said second root radius, said roots having said first root radius being randomly arranged with said roots having said second root radius in a predetermined pattern about said sprocket periphery.

5. The roller chain and sprocket drive of claim 1, wherein a plurality of roots have a third root radius, said third root radius being less than said second root radius.

6. The roller chain and sprocket drive of claim 1 further comprising a third generally circular sprocket having roots of the first and second root radius, said third sprocket being located along said first strand length to define a fourth strand length between said first initial engagement point with said first sprocket and a first initial engagement point with said third sprocket, said third sprocket being located along said first strand length to define a fifth strand length between a second initial engagement point with said third sprocket and said first initial engagement point with said second sprocket, a position of engagement points of the first, second and third sprockets and the roller chain selected to provide favorable dynamics to the roller chain and sprocket drive by minimizing the variation of and causing the occurrence of the maximum length of said second strand length to be out of phase from the occurrence of the maximum length of said fourth strand length.

7. The roller chain and sprocket drive of claim 4, wherein a pattern of roots having the first root radius and a pattern of roots having the second root radius are identical for said first and second generally circular sprockets.

8. The roller chain and sprocket drive of claim 5, wherein said roots having said third root radius are randomly arranged with said roots having said first root radius and said roots having said second root radius in a predetermined pattern about said sprocket periphery.

9. The roller chain and sprocket drive of claim 8, wherein said predetermined pattern is arranged so that at least one root having said second root radius is always between a root having said first radius and a root having said third radius.

10. The roller chain and sprocket drive of claim 8 wherein said pattern includes in part the following sequence of root radii:

first radius, second radius, third radius, third radius, second radius, first radius.

11. The roller chain and sprocket drive of claim 6 wherein the position of the engagement points of the first, second and third sprockets and the roller chain provides favorable dynamics by minimizing the variation of said fourth strand length and said fifth strand length.

12. The roller chain and sprocket drive of claim 11 wherein the position of the engagement points of the first, second and third sprockets and the roller chain provides favorable dynamics by minimizing the variation of said second strand length.

13. A roller chain and sprocket drive, comprising: a roller chain having a plurality of pairs of interleaved links, said pairs of links being interconnected by pivot pins, each of said pivot pins containing a roller member;

first and second generally circular sprockets, each sprocket having a plurality of teeth spaced about its periphery, each sprocket including roots located between pairs of adjacent teeth for receiving said rollers, each of said roots having a root radius defined as the distance between the center of a sprocket and a point along said root closest to the sprocket center in the radial direction, at least one of said roots having a first root radius, at least one of said roots having a second root radius, said second root radius being less than said first root radius, said chain extending between said first and second generally circular sprockets to define a first strand length along a first length of said chain between a first initial engagement point with said first sprocket and a first initial engagement point with said second sprocket, said chain extending between said first and second generally circular sprockets to define a second strand length along a second length of said chain between a second initial engagement point with said first sprocket and a second initial engagement point with said second sprocket, said first strand length and said second strand length each varying as said chain travels around said sprockets and different portions of the chain are presented to said engagement points of said sprockets, said first and second generally circular sprockets being oriented so as to reduce simultaneous occurrences of said first strand of the roller chain entering or exiting the first sprocket at a first root radius while said second strand of the roller chain is exiting or entering the second sprocket at a first root radius.

14. The roller chain and sprocket drive of claim 13 wherein the orientation increases the occurrences when the chain strand exits the first sprocket at a first root radius and enters the second sprocket at the second root radius.

* * * * *

UNITED STATES PATENT AND TRADEMARK OFFICE
CERTIFICATE OF CORRECTION

PATENT NO. : 6,213,905 B1
DATED : April 10, 2001
INVENTOR(S) : White et al.

It is certified that error appears in the above-identified patent and that said Letters Patent is hereby corrected as shown below:

<u>Title page,</u>
Item [56], References Cited, U.S. PATENT DOCUMENTS, 4,348,200," change "Tcrada" to -- Terada --.

<u>Column 7,</u>
Line 10, change "strands" to -- strand --.
Line 52, after "of" insert -- said second strand length and said fourth strand length and said fifth strand length --

Signed and Sealed this

Twenty-seventh Day of August, 2002

Attest:

Attesting Officer

JAMES E. ROGAN
*Director of the United States Patent and Trademark Office*